Figure 1:
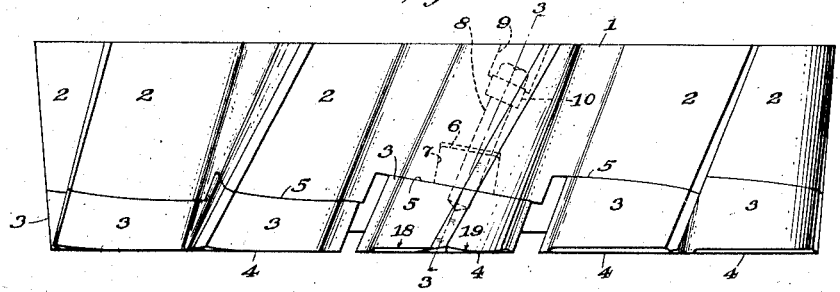

Oct. 30, 1928.

O. SEVERSON 1,689,973

CUTTER FOR PLANING GEAR TEETH

Filed Dec. 20, 1924    2 Sheets-Sheet 1

Inventor
Ole Severson
By Attorney
Albert F. Nathan

Oct. 30, 1928.

O. SEVERSON 1,689,973

CUTTER FOR PLANING GEAR TEETH

Filed Dec. 20, 1924

2 Sheets-Sheet 2

Inventor
Ole Severson
By Attorney
Albert F. Nathan

Patented Oct. 30, 1928.

UNITED STATES PATENT OFFICE.

OLE SEVERSON, OF SHELTON, CONNECTICUT, ASSIGNOR TO THE O. K. TOOL COMPANY, INC., OF NEW YORK, N. Y., A CORPORATION OF NEW YORK.

CUTTER FOR PLANING GEAR TEETH.

Application filed December 20, 1924. Serial No. 757,197.

My invention relates to cutters having teeth provided with detachable cutting members for engaging the work and particularly to cutters of this type for cutting teeth on gear wheels.

One object of my invention is to provide a form cutter for operating in the manner of a planing tool that shall be provided with detachable form cutting members for engaging the work being operated on and that shall have the cutting members secured to the cutter teeth in a novel manner.

A further object of my invention is to provide a cutter of the above indicated type that shall have the teeth so disposed at an angle with respect to the axis of the cutter as to permit the cutting of double helical or the so-called herring-bone teeth with facility.

In cutting herring-bone or double-helical teeth on a gear wheel it has been found very advantageous to use a cutter having teeth shaped in accordance with the teeth to be cut and disposed at an angle with respect to the axis of the cutter. In operation the cutter is so moved as to effect a cutting operation in the manner of a planing tool. Heretofore such cutters have been formed with the cutting teeth as an integral part of the body portion of the cutter. When a cutter is so constructed it is necessary to construct the complete cutter with the same material as is required by the cutting faces of the teeth. Accordingly if the cutting faces are destroyed or worn away it is necessary to replace the complete cutter.

In a cutter constructed in accordance with my invention detachable cutting members are preferably secured to the front face of each tooth. Such detachable cutting members conform to the shape of the teeth and may be quickly removed for repair or replacement. In a cutter so constructed it is apparent that the cutting members may be composed of a very high quality of tool-steel whereas the body portion of the cutter and the teeth which support the cutting members may be composed of any desired material.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
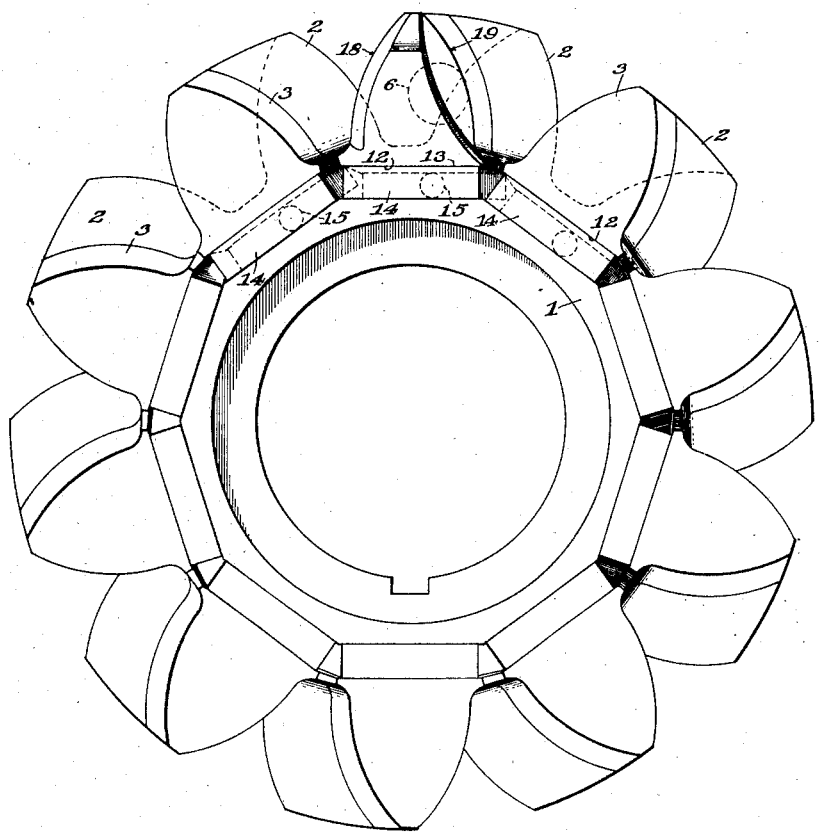
Figure 3:
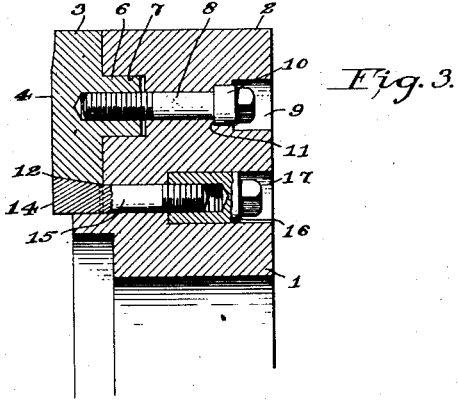
Figure 7:
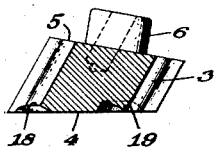
Figure 4:
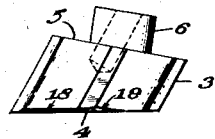
Figure 8:
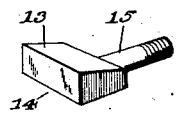
Figure 5:
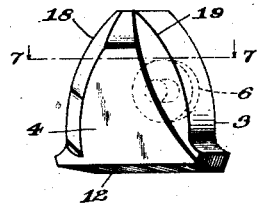
Figure 6:
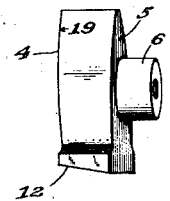

In the accompanying drawings, Fig. 1 is a side elevational view of a cutter constructed in accordance with my invention. Fig. 2 is an end elevational view of the cutter shown in Fig. 1. Fig. 3 is a sectional view along the line 3—3 of Fig. 1. Fig. 4 is a plan view of a cutting member adapted to be secured to a tooth. Figs. 5 and 6 are isometric views of the cutting member shown in Fig. 4. Fig. 7 is a sectional view along the line 7—7 of Fig. 5. Fig. 8 is an isometric view of the wedge-member for securing a cutting member in its position.

Referring to the drawings, an annular body member 1 has a number of teeth 2 formed on the periphery thereof. A central opening is formed in the body member for mounting on an arbor, the axis of the cutter being concentric with such opening. The teeth 2 are shaped in accordance with the form of the gear teeth to be cut by the cutter and extend at an angle with respect to the axis of the cutter or of the arbor on which the cutter is mounted as shown in Figs. 1 and 2 of the drawing. The teeth are so disposed as to permit the cutting of herring-bone or double helical gear teeth with facility. The teeth of the cutter effect a cutting operation in the manner of a planing tool.

Cutting members 3 which are preferably composed of a high grade of tool steel are secured to the front face of each tooth 2. The cutting members 3 conform to the shape of the teeth 2 and are composed of material adapted to withstand the cutting operation. The front face 4 of each cutting member 3 is located in a plane substantially perpendicular to the axis of the cutter. The rear face 5 of each cutting member is in a plane angularly disposed with respect to the plane of the front cutting face and preferably such rear face is substantially perpendicular to the center line of the associated tooth when the cutting member is in position on the cutter.

A lug 6, which is preferably cylindrical in form projects from the rear face 5 of each cutting member. The lug 6 is fitted to an orifice 7 in the associated tooth, as indicated in Fig. 3 of the drawing. Preferably the projection 6 is centrally located with respect to the cutting member or towards the top of the member in order to more securely hold the cutting member in position to insure against any rotative movement by it with respect to the associated tooth. A bolt 8, which projects through each tooth 2, threadably engages the projection 6 on the cutting member and serves to hold the cutting member securely in position against the face of the tooth. The rear face of the tooth 2 is countersunk at 9 in order to permit the bolt 8 to be wholly contained within the tooth. A shoulder 10 on the bolt, which is fitted to a recess 11 in the tooth, serves to engage the tooth for forcing the cutting member against the front face of the tooth.

The lower surface 12 of the cutting member is inclined or wedged shape to engage a similar surface 13 on a wedge-member 14. The wedge-member 14 is supported on the body portion 1 of the cutter, as shown in Fig. 3 of the drawing, and is provided with a stem portion 15 which extends into the associated tooth 2. A cylindrically shaped nut 16, which is fitted to an orifice 17 in the rear of the tooth 2, engages the threaded end of the stem 15 and serves to securely wedge the member 14 against the cutting member 3. The wedge-member 14 serves not only to support this associated cutting member 3 but also prevents any rotative movement of the cutting member 3 about the projection 6 as a center.

The side cutting edges 18 and 19 of each cutting member 3 are cut away as indicated in Figs. 5 and 7 of the drawings in order to insure efficient cutting operation by the teeth. In the above described cutter it will be noted the wear effected during the cutting operation falls substantially entirely upon the cutting members 3. The teeth 2 of the cutter serve principly for supporting cutting members 3 and for adding strength to the cutter. The cutting members 3 are composed of material best adapted to withstand the cutting operation and may be replaced with little trouble. Although a cutter of only one hand is shown on the drawing it is to be understood my invention is equally applicable to cutters of either hand.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a reciprocating cutter, the combination comprising a cylindrical body member having teeth formed around the periphery thereof, detachable cutting members secured to the forward face of said teeth, said cutting members having projections fitted to orifices in the teeth, a bolt for securing each projection to the associated tooth, and adjustable wedge members for supporting the cutting members and for insuring against any rotative movement thereby.

2. In a reciprocating cutter, the combination comprising an annular body member having teeth formed around the periphery thereof and extending at an angle with respect to the cutter axis, cutting members secured to the forward face of said teeth, said cutting members conforming to the shape of the teeth and having projections fitted to orifices in the teeth, a bolt for securing each projection to the associated tooth, and adjustable wedge members for supporting the cutting members and for preventing any rotary movement thereof about the projections as centers.

3. In a reciprocating cutter, the combination comprising a cylindrical body member having teeth formed around the periphery thereof, and a detachable cutting member secured to the front face of each tooth and conforming to the shape of the tooth, each of said cutting members being joined to the front face of the associated tooth in a plane making an angle with respect to the front cutting face of the member.

4. In a reciprocating cutter, the combination comprising a cylindrical body member having teeth formed around the periphery thereof and extending at an angle with respect to the axis of the cutter, and a detachable cutting member secured to the front face of each tooth, each of said cutting members having a front face substantially perpendicular to the axis of the cutter and a rear face engaging a tooth in a plane substantially perpendicular to the center line of the tooth.

5. In a reciprocating cutter for forming gear teeth, the combination comprising a cylindrical body member having teeth formed on the periphery thereof, said teeth being shaped to cut the desired gear teeth and extending at an angle with respect to the axis of the cutter, and a detachable cutting member secured to the front face of each tooth, the plane of engagement between each cutting member and the associated tooth being substantially perpendicular to the center line of the tooth.

6. In a reciprocating cutter for forming gear teeth, the combination comprising a cylindrical body member having teeth formed on the periphery thereof, said teeth being shaped to cut the desired gear teeth and extending at an angle with respect to the axis of the cutter, a detachable cutting member secured to the front face of each tooth, the plane of engagement between each cutting member and the associated tooth being substantially perpendicular to the center line of the tooth, a projection from each cutting member fitted to an orifice in the associated tooth, and a bolt for securing the projection to the associated tooth.

7. In a reciprocating cutter for forming gear-teeth, the combination comprising an annular body member having teeth formed around the periphery thereof, said teeth extending at an angle with respect to the axis of the cutter, a detachable cutting member secured to each tooth, means comprising wedge members secured to the teeth and engaging the bottoms of the cutting members and a bolt secured to each cutting member and to the associated tooth.

8. A gear cutter of the planer type comprising a cylindrical body member having supporting teeth on the periphery thereof; detachable cutter bits adapted to be secured to the forward faces of said teeth; screw fastening means therefor directly engaging the cutter bits; and wedging means engaging the base of each cutter bit to lock it in position.

9. A gear cutter of the planer type comprising a cylindrical body member having supporting teeth on the periphery thereof; cutter bits fitted to the forward faces of said teeth; means for fastening said cutter bits thereon comprising screw bolts secured to said cutter bits and extending longitudinally of said teeth; and abutment means engaging the base of each tooth.

10. A gear cutter of the reciprocatory type comprising a body member formed with supporting teeth on the periphery thereof; cutter bits adapted to be supported on the forward faces of said teeth; interfitting formations on the adjoining surfaces; a ledge portion extending from said body member adjacent but spaced from the inner edge of each tooth to form openings therebetween; and wedging members adapted to adjustably engage in said openings for locking said cutter bits in position.

In witness whereof, I have hereunto subscribed my name.

OLE SEVERSON.